United States Patent
Preiswerk et al.

(10) Patent No.: US 11,893,786 B1
(45) Date of Patent: Feb. 6, 2024

(54) SCAN-FREE BARCODE READING

(71) Applicant: Amazon Technologies, Inc., Seattle, WA (US)

(72) Inventors: Frank Preiswerk, Brooklyn, NY (US); Timothy Stallman, Groton, MA (US); Michael R. Calder, Westborough, MA (US); Armon Shariati, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 221 days.

(21) Appl. No.: 17/404,519

(22) Filed: Aug. 17, 2021

(51) Int. Cl.
| | | |
|---|---|---|
| *G06V 10/25* | (2022.01) | |
| *G06V 20/10* | (2022.01) | |
| *G06K 7/14* | (2006.01) | |
| *G06F 18/214* | (2023.01) | |
| *G06F 18/25* | (2023.01) | |
| *G06V 10/80* | (2022.01) | |
| *G06V 30/00* | (2022.01) | |

(52) U.S. Cl.
CPC ............ *G06V 20/10* (2022.01); *G06F 18/214* (2023.01); *G06F 18/253* (2023.01); *G06K 7/1413* (2013.01); *G06V 10/25* (2022.01); *G06V 10/806* (2022.01); *G06V 30/00* (2022.01)

(58) Field of Classification Search
CPC ...... G06V 20/10; G06V 10/25; G06V 10/806; G06V 30/00; G06F 18/214; G06F 18/253; G06K 7/1413
See application file for complete search history.

(56) References Cited

U.S. PATENT DOCUMENTS

| | | | | | |
|---|---|---|---|---|---|
| 5,134,272 | A | * | 7/1992 | Tsuchiya | ............ G06K 7/1443 382/184 |
| 5,504,319 | A | * | 4/1996 | Li | ........................ G06K 7/1456 382/318 |
| 2002/0117545 | A1 | * | 8/2002 | Tsikos | ................... G02B 27/48 235/454 |

(Continued)

OTHER PUBLICATIONS

Amazon.com, "Amazon Dash Cart", retrieved Jul. 12, 2021, 3 pages. <https://www.amazon.com/b?ie=UTF8&node=21289116011 <https://protect-us.mimecast.com/s/RF_ICIYkVmcwVrYUGQXOE?domain=amazon.com>.

(Continued)

*Primary Examiner* — Aaron W Carter
(74) *Attorney, Agent, or Firm* — Eversheds Sutherland (US) LLP

(57) ABSTRACT

Systems and techniques for performing a scan-free reading of a structured identifier are provided. One technique involves obtaining a first set of images of an object within a scanning volume of an environment. The object is passed through the scanning volume without an explicit presentation of the structured identifier to an optical scanner within the environment. For each image of a plurality of the first set of images, an indication of a first region of interest of the structured identifier on the object within the image is obtained, based in part on a second set of images of the object having a lower quality than the first set of images. The first region of interest of the structured identifier is extracted from a first image of the plurality of the first set of images. The structured identifier within the first region of interest within the first image is decoded.

20 Claims, 16 Drawing Sheets

(56) References Cited

U.S. PATENT DOCUMENTS

| | | | | |
|---|---|---|---|---|
| 2002/0185535 | A1* | 12/2002 | Tsikos | G06K 7/10861 |
| | | | | 235/454 |
| 2006/0011724 | A1* | 1/2006 | Joseph | H04N 25/42 |
| | | | | 348/E3.02 |
| 2011/0135160 | A1* | 6/2011 | Sagan | G06V 30/2504 |
| | | | | 382/108 |
| 2014/0097246 | A1* | 4/2014 | Hu | G06K 7/1417 |
| | | | | 235/437 |
| 2014/0105452 | A1* | 4/2014 | Bowne | G06V 10/94 |
| | | | | 382/101 |
| 2015/0363758 | A1* | 12/2015 | Wu | G06Q 10/087 |
| | | | | 705/20 |
| 2017/0032311 | A1* | 2/2017 | Rizzolo | G06V 10/25 |
| 2018/0365462 | A1* | 12/2018 | Gutfinger | G06K 7/1443 |
| 2021/0118661 | A1* | 4/2021 | Corkum | H01J 49/0418 |
| 2021/0256285 | A1* | 8/2021 | Canini | G06K 7/10752 |
| 2022/0279110 | A1* | 9/2022 | Suzuki | H04N 7/18 |
| 2022/0284384 | A1* | 9/2022 | Chaubard | G06V 20/52 |
| 2023/0206016 | A1* | 6/2023 | McQueen | G06Q 20/208 |
| | | | | 382/100 |

OTHER PUBLICATIONS

N. Statt, "Amazon's new smart shopping cart lets you check out without a cashier", dated Jul. 14, 2020, retrieved Jul. 12, 2021, 4 pages. <https://www.theverge.com/2020/7/14/21323421/amazon-dash-cart-smart-grocery-shopping-woodland-hills-store-cashierless <https://protect-us.mimecast.com/s/5niNCmZ0VnhogxQfOu3Ru?domain=theverge.com>.

* cited by examiner

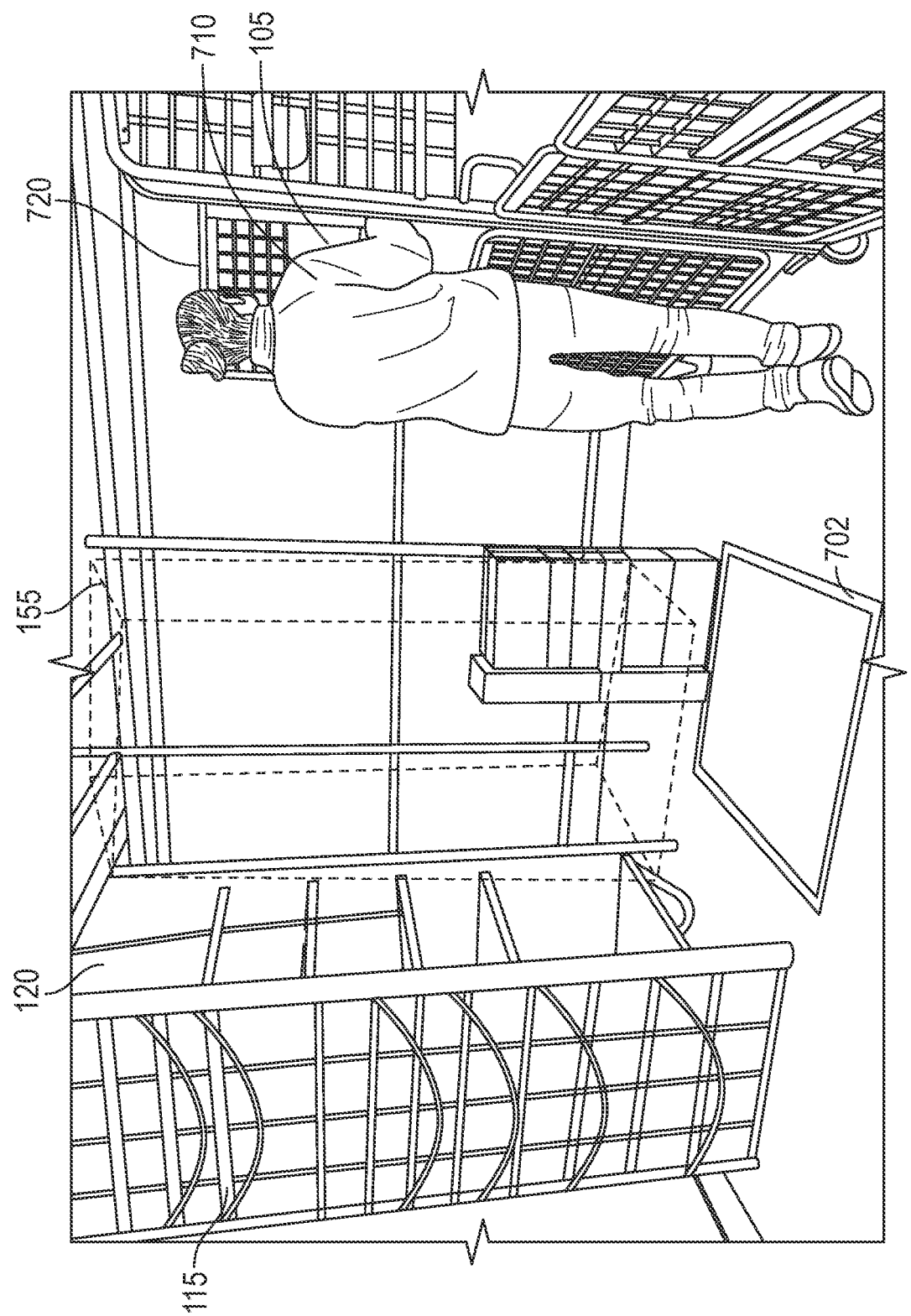

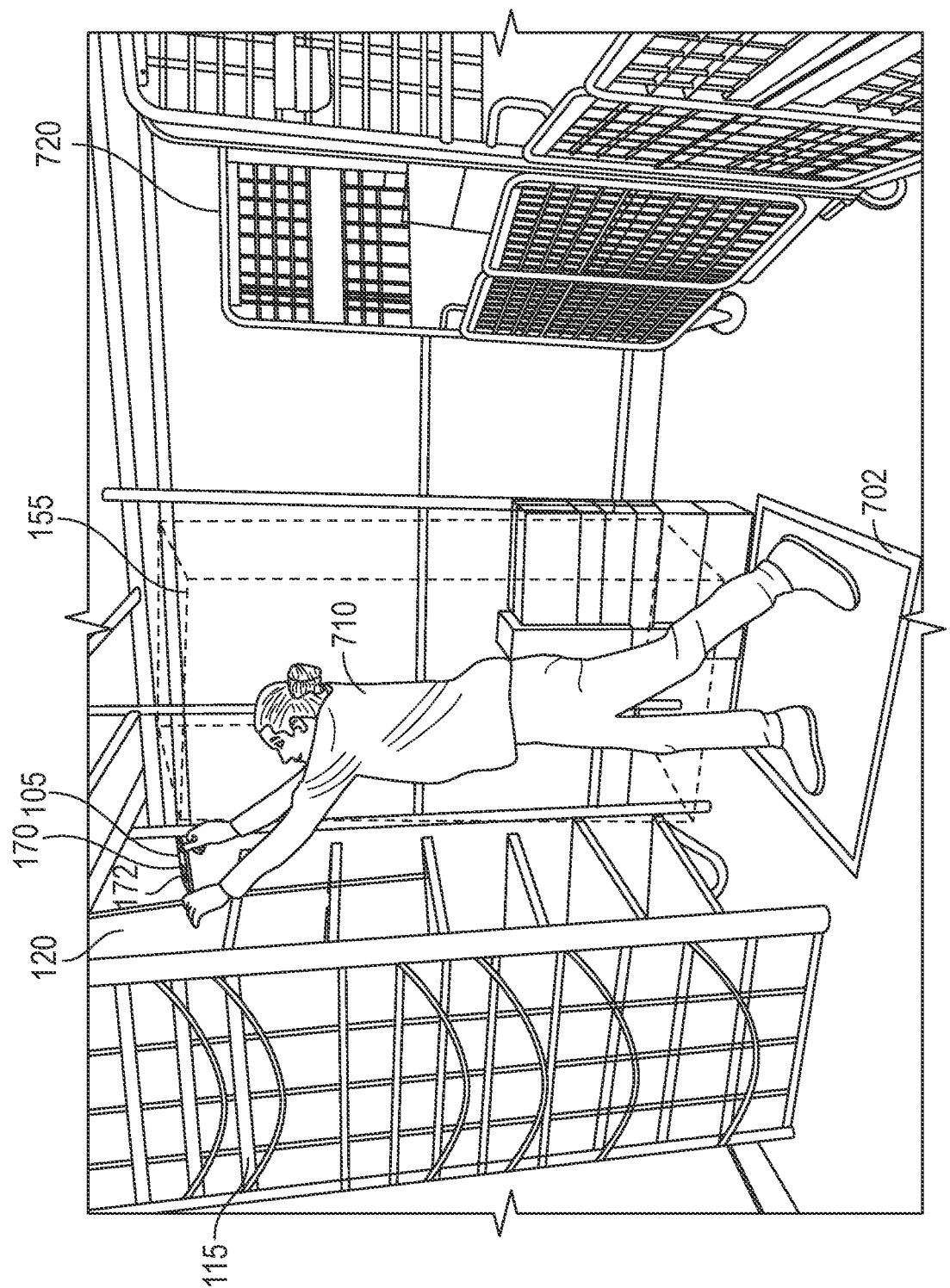

SCAN-FREE BARCODE READING

BACKGROUND

The present invention generally relates to camera-based scanning systems, and more specifically, to a system for reading structured identifiers without an explicit scan of the structured identifier by an optical scanner.

Retailers, wholesalers, and other product distributors typically maintain an inventory of various items that may be ordered, leased, borrowed, rented, viewed, and so forth, by clients or customers. For example, an e-commerce website may maintain inventory in a fulfillment center. In this example, when a customer orders an item, the item is picked from inventory, routed to a packing station, packed, and shipped to the customer. Facilities generally use structured identifiers, such as barcodes, to identify and track items through various stages of the facility. A barcode, for example, is typically a set of symbols that stores identifying information about an item associated with the barcode. The barcode on a given item can be read, decoded, and processed to extract the data for a variety of applications (e.g., pricing, order fulfillment, sortation, shipping, etc.).

BRIEF DESCRIPTION OF DRAWINGS

Various embodiments in accordance with the present disclosure will be described with reference to the drawings, where like designations denote like elements.

FIG. 7A-7G illustrate another example sequence for performing a scan-free reading of a structured identifier during a facility operation, according to one embodiment.

DETAILED DESCRIPTION

Figure 1:
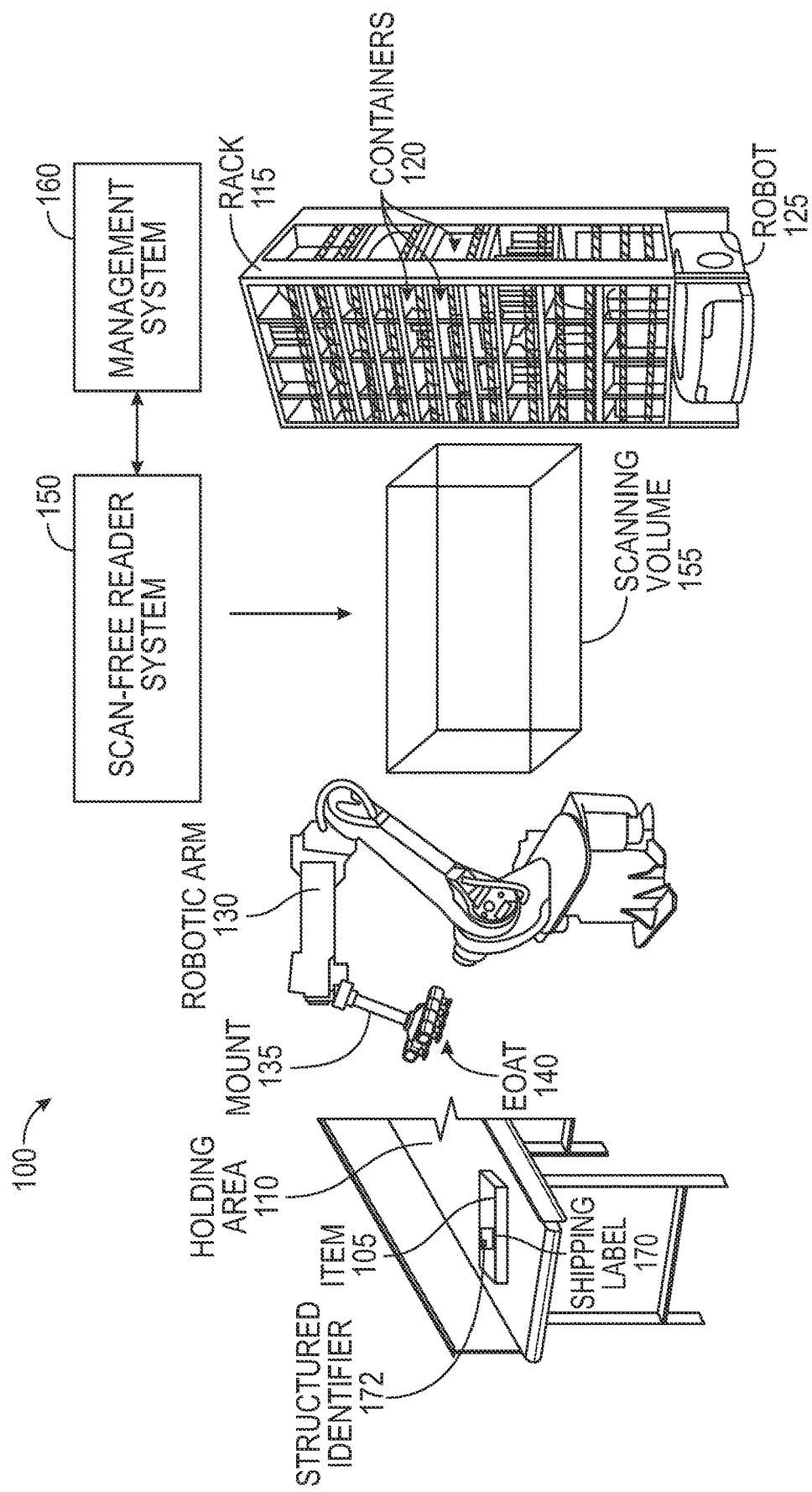
FIG. 1 illustrates an example stow or pick system, according to one embodiment.

A facility (e.g., shipping warehouse, fulfillment center, etc.) can perform tasks such as sorting items, picking items, shipping items, storing items, and the like. As an example, an item may be retrieved from storage and transported to a location in preparation for stowing in a container. In another example, an item can be retrieved (or picked) from a container in preparation for shipping.

For some tasks, the facility can use a computer-vision system to process data received from camera-based (or image-based) barcode reader(s) (or scanner(s)) in the facility. For example, the computer vision system can use the camera-based barcode reader(s) to detect and read structured identifiers (e.g., linear barcodes or one dimensional (1D) barcodes) on various items (or packages) in the facility. The structured identifier on an item may include identifying information for the item (e.g., globally unique identifier), target location information for the item, item attributes, etc. Structured identifiers (e.g., barcodes) can be applied to items (or packages) using different types of labels (also referred to as label stickers, shipping labels, etc.), such as Scan, Label, Manifest, Apply (SLAM) labels, Fulfillment Network Stock Keeping Unit (FNSKU) labels, etc.

In facilities that employ conventional optical scanning systems (e.g., barcode readers), the structured identifier on a given item generally has to be explicitly presented to the optical scanning system so that the optical scanning system can read (or scan) and decode the structured identifier. For example, assuming an operator (e.g., human, robotic arm, etc.) is engaged in a picking operation, the operator may retrieve an item from a container, locate the shipping label on the item, locate the structured identifier within the shipping label, explicitly (or deliberately or intentionally) present the structured identifier within a field-of-view of the optical scanning system for scanning, and place the item in another location upon receiving an indication that the item has been successfully scanned. In another example, assuming an item is transitioning within the facility on a transport device (e.g., conveyor belt), the item may be transitioned to a structured environment for scanning via the transport device where there is limited tolerance for variation in item location. In this example, the item may have to have a predefined position and/or orientation so that the structured identifier on the item can be successfully scanned. Given that a facility can process vast quantities of items, employing an optical scanning system in which structured identifiers have to be explicitly presented to the optical scanners (e.g., barcode readers) can significantly increase the amount of time it takes to process items, impacting the workflow of the facility.

As such, embodiments described herein provide systems and techniques for reading structured identifiers in a "scan-free" manner. That is, embodiments provide systems and techniques that allow for items to be scanned in a non-invasive manner where the structured identifier on a given item does not have to be explicitly presented to an optical scanner (e.g., barcode reader, camera, etc.). As used herein, "scan-free reading" may refer to reading a structured identifier without an explicit (or deliberate) presentation of the structured identifier to any optical scanner. In some cases, embodiments may perform a "scan-free reading" of a structured identifier on an object as the object transitions through a defined volume in an unstructured manner. For example, the unstructured manner can include flipping, rotating, throwing, etc. In another example, the unstructured manner can include refraining from explicitly presenting the structured identifier on the object to an optical scanner. In some cases, embodiments may perform a "scan-free reading" of a structured identifier on an object as the object transitions through a defined volume in a limited structured manner. For example, an operator (e.g., robotic arm) may be configured to transition an object from one location to another using a predefined or dynamically determined movement profile. In this example, the operator may transition the object using the movement profile, but may refrain from orienting the object in order to explicitly present the structured identifier on the object to an optical scanner. In one embodiment described herein, a "scan-free reader system" includes multiple high quality imaging (or optical) sensors and a computing system(s). The multiple imaging sensors may be connected to the computing system(s) via a dedicated network interface. In some cases, the multiple imaging sensors and computing system(s) may be associated with a given station within a facility (e.g., picking station, sorting station, etc.).

The imaging sensors can be disposed (or placed or fixed) within a given environment in order to create a predefined scanning volume of a working area (e.g., picking area, sorting area, etc.). In some embodiments, the imaging sensors can be attached to or coupled to wide-angle optical lenses. The scanning volume is a transparent three-dimensional (3D) region of space in which an operator (e.g., human, robotic arm, etc.) can move an item (or package) without explicitly presenting the item to a barcode reader for scanning. For example, an associate in a picking operation may simply retrieve an item from a container and transport the item to another location through the scanning volume (without explicitly presenting the item to a barcode reader) in order for the item to be scanned. In some cases, the "scan-free reader system" can scan an item that passes through the scanning volume regardless of the manner in which the item is passed through the scanning volume. That is, the item can pass through the scanning volume in any unstructured or limited structured manner (e.g., flipped, rotated, thrown, etc.).

At a given point in time (e.g., a particular time instance), the computing system may receive, from the imaging sensors, a stream of high quality images of an item that is within the scanning volume at the point in time (e.g., the item may be passing through the scanning volume). The computing system may process the high quality images and generate a low quality version of the images. The computing system may evaluate the low quality version of the images with a machine learning model that is configured to detect and localize the region of interest (ROI) of structured identifiers within the images.

Once the ROI(s) of the structured identifiers from the low quality version of the images are determined, the computing system may extract the corresponding ROI(s) of the structured identifiers from the high quality version of the images. The extracted ROI(s) of the structured identifiers from the high quality version of the images may include high quality images of the structured identifier for the item. The computing system may process the extracted ROI(s) of the structured identifiers from the high quality version of the images using structured identifier scanning algorithms (e.g., barcode reading algorithms) and/or machine learning techniques to decode the structured identifier information for the given item. As described below, in some embodiments, the computing system may be equipped with multiple central processing units (CPUs) and/or graphics processing units (GPUs) that can decode the structured identifier information in parallel, significantly reducing the amount of time it takes to process high quality images at a high frame rate.

In this manner, embodiments can provide a scanning volume that can read structured identifiers without requiring operators to explicitly present the structured identifiers to an optical scanner. Note that while embodiments herein primarily discuss "scan-free reading" within a facility, such as a fulfillment center, this disclosure is not limited to such environments and can be used for other applications. For example, the techniques described herein could be used in retail stores (e.g., to identify and track items for sale), in postal service locations (e.g., to identify and track mail), or in any environment in which item identification is involved. Additionally, while embodiments herein primarily use "barcodes" as a reference example of a structured identifier, the structured identifier can include any type of globally unique identifier used to identify an item. Examples of such structured identifiers can include visual and/or geometric features of a label (e.g., ridges, edges, pixel value intensity changes), text, 1D barcodes, two-dimensional (2D) barcodes, etc.

Additionally, note that, as used herein, the "quality" of an image may refer to (or be based on) one or more image attributes, such as sharpness, noise, dynamic range, resolution, contrast, etc. A "high quality" image, for example, may include a higher sharpness, lower noise, higher dynamic range, higher resolution, etc. relative to a "low quality" image. Similarly, a "low quality" image, for example, may include a lower sharpness, higher noise, lower dynamic range, lower resolution, etc., relative to a "high quality" image.

FIG. 1 illustrates a stow or pick system 100 (referred to herein as system 100), according to one embodiment. The system 100 may be located in a facility (e.g., warehouse, factory, distribution center, etc.). In one particular embodiment, the system 100 is a robotic stowing or picking system. The system 100 can be located in a fulfillment center that performs various operations in order to ship items to customers. Here, the system 100 includes a rack 115 (also referred to as an inventory holder) that includes multiple containers 120 (for holding or storing items 105). The system 100 also includes a robot 125 that can pick up and move the rack 115 to a particular (or desired) location. The system 100 further includes a robotic arm 130 that can access the containers 120 on the rack, e.g., for a robotic stowing or picking operation. The rack 115 can have containers on multiple sides that can be accessed via the robot 125 spinning the rack 115 so that each side of the rack 115 can face the robotic arm 130 or a different robotic arm(s) (not shown).

In one embodiment, the robot 125 can move the rack 115 to a position proximate to the robotic arm 130, e.g., to enable the robotic arm 130 to stow items into (or pick items from) the containers 120. In another embodiment, the robotic arm 130 may be mobile and the racks 115 can be stationary. In this case, the robotic arm 130 may move between the racks 115 to perform stow and pick operations.

The robotic arm 130 includes a mount 135, which can support various sensors and end-of-arm tools (EOATs) for stowing and/or picking items from the containers 120. Here, for example, the mount 135 supports an EOAT 140, which includes a suction device for grasping, transporting, and stowing items into a particular container. For example, the EOAT 140 can grasp an item 105 (also referred to as a package or object) located in a holding area 110 (also referred to as an item holding location) and transport the item 105 to a particular container 120. The holding area 110 is representative of a variety of surfaces and can have any form factor suitable for holding items (e.g., table, floor, conveyor belt, etc.).

As shown, the system 100 also includes a scan-free reader system 150 and a management system 160. The scan-free reader system 150 is generally configured to provide a scanning volume 155, in which items 105 can pass to be scanned without an explicit presentation of the item's structured identifier 172 to any optical scanner (e.g., camera). Although shown here as a rectangular volume, the scanning volume 155 can have any 3D geometrical shape (e.g., cylinder, cone, triangular, etc.). Additionally, while the scanning volume 155 is depicted as visible within FIG. 1, the scanning volume 155 (including the boundaries of the scanning volume 155) may be transparent to an operator.

In this embodiment, when performing a pick or stow operation, the robotic arm 130 may transition an item through the scanning volume 155 (e.g., from holding area 110 to a container 120) without explicitly presenting the item 105 to an optical scanner for scanning. That is, embodiments do not require an operator to orient the item 105, such that the structured identifier 172 on the shipping label 170 of the item 105 is clearly visible to an optical scanner. Instead, as the item 105 passes through the scanning volume 155, the scan-free reader system 150 may capture multiple high quality images of the item 105 and perform processing on the images to extract one or more images of the structured identifier 172 of the item. The scan-free reader system 150 may decode the images of the structured identifier 172 and transmit the information to the management system 160 to use for managing facility operations. Note, the scan-free reader system 150 is described in more detail below with respect to FIG. 2.

Figure 2:
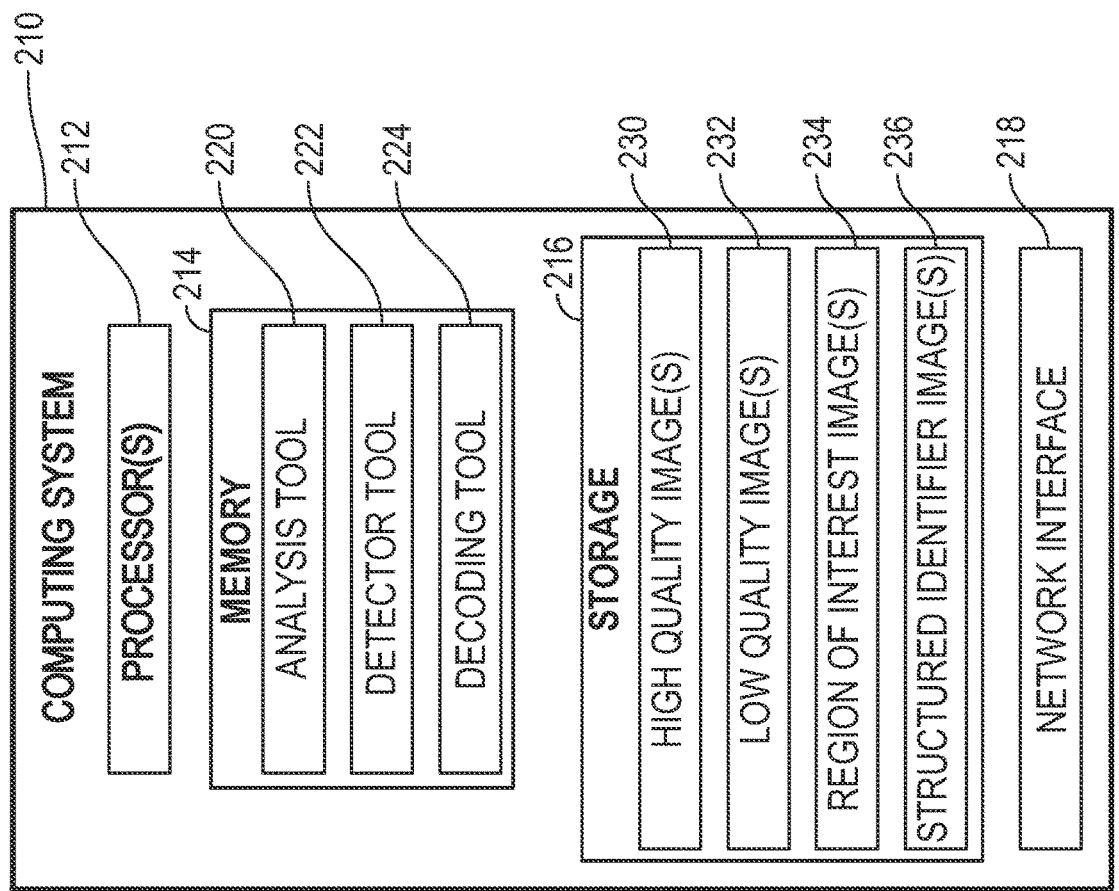
FIG. 2 further illustrates components of a scan-free reader system described relative to FIG. 1, according to one embodiment.

FIG. 2 further illustrates components of the scan-free reader system 150 described relative to FIG. 1, according to one embodiment. As shown, the scan-free reader system 150 includes camera devices 202 1-K connected to a computing system 210. The camera devices 202 1-K may be connected to the computing system 210 via a wireless or wired network. Here, for example, each camera device 202 1-K is connected to the computing system 210 via respective wired communication links 260 1-K. In one embodiment, the camera devices 202 may communicate with the computing system 210 using a communication protocol, for example, Universal Serial Bus (USB), such as USB-3.

Each camera device 202 includes an image sensor 204, imaging optics 206, and a network interface 208. The camera device 202 can capture an image of a given item with the image sensor 204. The image sensor 204 is representative of a variety of types of electronic image sensors. The image sensor 204 may use a rolling shutter or a global shutter. The imaging optics 206 may include various optics, such as lens with a particular focal length. The network interface 208 can include any communications interface (e.g., serial, wireless, etc.) that allows the camera device 202 to communicate with other computers and/or components in the system 100.

The computing system 210 includes a processor(s) 212, a memory 214, storage 216, and a network interface 218. The processor(s) 212 represents any number of processing elements which can include any number of processing cores. In one embodiment, the processors 212 can include one or more CPUs and one or more GPUs. As described in more detail below, in some embodiments, the GPU(s) may be used to detect and localize the ROI(s) of structured identifiers from images, using one or more machine learning models. Additionally or alternatively, in some embodiments, the CPU(s) may be used to process, in parallel, the structured identifiers from the different ROIs extracted from the high quality versions of images (captured by the camera devices 202).

The memory 214 can include volatile memory, non-volatile memory, and combinations thereof. The storage 216 may be a disk drive storage device. Although shown as a single unit, the storage 216 may be a combination of fixed and/or removable storage devices, such as fixed disc drives, removable memory cards, or optical storage, network attached storage (NAS), or a storage area-network (SAN). In one embodiment, the computing elements (or components) shown in the computing system 210 may correspond to a physical computing system or may correspond to one or more virtual computing instances executing within a computing cloud. Here, the storage 216 includes one or more high quality images 230, one or more low quality images 232, one or more ROI images 234, and one or more structured identifier images 236, described in more detail below. The network interface 218 may be any type of network communications interface (e.g., Ethernet, serial, wireless, etc.) that allows the computing system 210 to communicate with other computers and/or components in the system 100.

As shown, the memory 214 includes an analysis tool 220, a detector tool 222, and a decoding tool 224, each of which can include software, hardware, or combinations thereof. In one embodiment, the analysis tool 220, detector tool 222, and the decoding tool 224 may be software applications executing on the computing system 210. The analysis tool 220 is generally configured to perform one or more image processing techniques on the high quality images (e.g., high quality image 230) captured by the camera devices 202 1-K. In one example, the high quality images may include high resolution images. In one embodiment, the analysis tool 220 may generate low quality versions of the high quality images (e.g., low quality images 232) by downsampling the images to obtain lower resolution images, for example.

The detector tool 222 is generally configured to process the low quality version of the images (output from the analysis tool 220) with a machine learning model(s) to determine, for each image, a ROI of a structured identifier within the image. The detector tool 222 may provide the structured identifier ROI information (e.g., as ROI images 234) to the analysis tool 220.

In some embodiments, the analysis tool 220 is also configured to use the structured identifier ROI information from the detector tool 222 to extract, from each high quality image, the corresponding ROI of the structured identifier from the high quality image. Compared to the size of the high quality images, the extracted ROIs may be smaller sized images. A portion of each extracted ROI may include a high quality representation of a structured identifier (e.g., structured identifier images 236). The analysis tool 220 may provide the extracted ROIs to the decoding tool 224.

The decoding tool 224 is generally configured to decode the structured identifier contained within each extracted ROI to obtain structured identifier data for the item. In one embodiment, the decoding tool 224 can use one or more structured identifier reading algorithms (e.g., barcode reading algorithms) to decode the structured identifier within each extracted ROI. In another embodiment, the decoding tool 224 can use one or more machine learning techniques to decode the structured identifier within each extracted ROI. The decoding tool 224 may provide the decoded structured identifier data to the management system 160.

Figure 3:
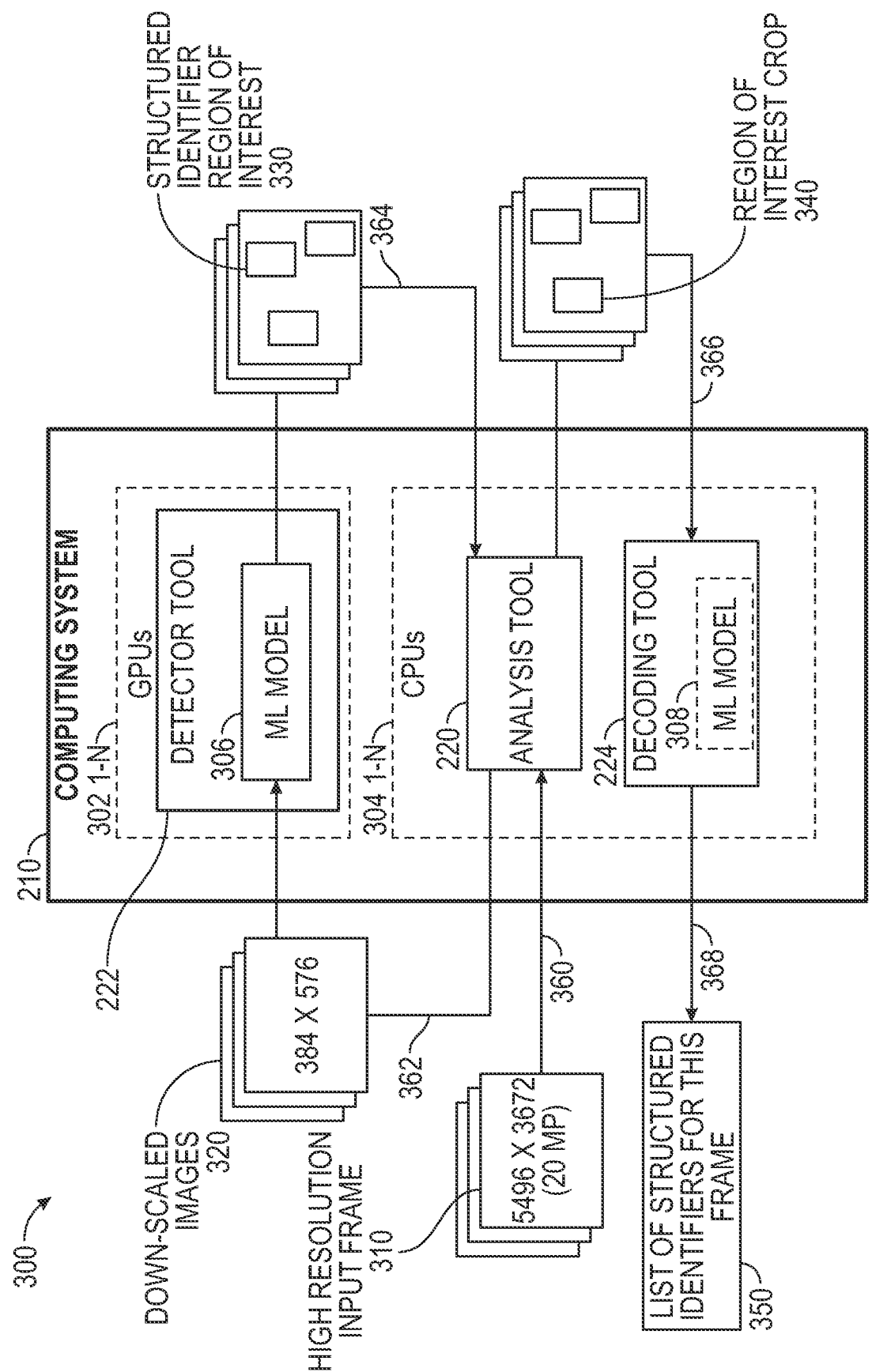
FIG. 3 is a block diagram of an example workflow for performing a scan-free reading of an item with a structured identifier, according to one embodiment.

FIG. 3 is a block diagram of an example workflow 300 for performing a scan-free reading of an item with a structured identifier, according to one embodiment. As shown, at a given time instance, the analysis tool 220 receives a high resolution input frame 310, which includes a high quality (e.g., high resolution) image (e.g., high quality image 230) from each camera (e.g., camera device 202) (step 360). In this embodiment, the high resolution input frame 310 includes multiple 20 megapixel (MP) images captured from the cameras 202. Note, however, that in other embodiments, the high resolution input frame 310 can include images of different resolutions and/or images having different image attributes of higher quality, relative to the low quality images 232.

The analysis tool 220 is configured to generate a set of low quality images (e.g., low quality images 232), by performing one or more image processing techniques on the high quality images 230 within the high resolution input frame 310. For example, the analysis tool 220 generates down-scaled images 320, e.g., by down-sampling the high quality images 230 captured from the camera devices 202 (step 362). The down-scaled images 320 depicted in FIG. 3 may be an example representation of the low quality images 232. In this particular embodiment, the analysis tool 220 performs downsampling on the set of 20 MP images to generate a set of approximately 221 kilopixel (KP) images. Note, however, that in other embodiments, the down-scaled images 320 can include images of different resolutions and/or images having different image attributes of lower quality, relative to the high quality images 230.

In some embodiments, the low quality images (e.g., low quality images 232) may be generated by the camera devices 202 as opposed to the analysis tool 220. In this embodiment, the camera devices 202 can be configured to perform one or more image processing techniques on the high quality images (e.g., high quality images 230) in order to generate the set of low quality images. In one embodiment, each camera device 202 can be configured to perform downsampling on the respective high quality image captured by the camera device 202 in order to generate a low quality image corresponding to that high quality image. Each camera device 202 may then transmit its generated low quality image and captured high quality image to the computing system 210. Using the computing system 210 depicted in FIG. 3 as a reference example, each camera device 202 may transmit its generated low quality image to the detector tool 222 and transmit the captured high quality image to the analysis tool 220.

In embodiments where the low quality images are generated by the camera devices 202, the computing system 210 can be configured to request the high quality images from the camera devices 202 when one or more predetermined conditions are satisfied. For example, when the object is within the scanning volume 155, the computing system 210, at each time instance, may receive multiple low quality images from the camera devices 202 and determine (via the detector tool 222), whether a structured identifier ROI 330 is present within a sufficient number of the low quality images (e.g., above a threshold). If the computing system 210 does detect a sufficient number of the low quality images include a structured identifier ROI 330, then the computing system 210 may request the high quality images corresponding to the low quality images (e.g., captured at the respective time instance) from the camera devices 202. In this manner, embodiments can significantly reduce computational intensity and save resources (e.g., compute resources, processor load, etc.), relative to analyzing the high quality images at each time instance.

The detector tool 222 includes a machine learning model 306, which is configured to detect and localize a ROI of a structured identifier (also referred to as structured identifier ROI) within a scene, given an image of the scene as input. Here, the machine learning model 306 receives the down-scaled images 320 from the analysis tool 220. For each down-scaled image 320, the machine learning model 306 outputs a set of information (e.g., structured identifier ROIs 330) indicating the ROI of the structured identifier within the down-scaled image 320 (step 364). In some embodiments, the ROI of the structured identifier can include a label (e.g., shipping label), which includes the structured identifier 172. In some embodiments, the ROI of the structured identifier may include a different region or portion of the item. For example, in some cases, the structured identifier may be affixed to the item without a label. Note, that the structured identifier ROIs 330 depicted in FIG. 3 are one reference example of the ROI images 234. For example, while the structured identifier ROIs 330 are shown as "bounding boxes," in other embodiments, the structured identifier ROIs 330 can have different shapes (e.g., circles, triangles, etc.). In one embodiment, the machine learning model 306 uses a fully convolutional one-stage object detection (FCOS) architecture. To train the machine learning model 306, sample images may be captured of operators performing a facility operation (e.g., stow or pick operation). Each image within the sample images may then be annotated with a region of interest placed around the structured identifier within the image. In one embodiment, the sample images may be annotated by human operator(s). In another embodiment, the sample images may be annotated using automated techniques. In this embodiment, for example, an optical scanning decoder (e.g., barcode decoder) can process the sample images to get the localization of the region of interest of the structured identifier within each image. In some cases, the optical scanning decoder may be configured to perform the localization process without performing the decoding process. Once annotated, the machine learning model 306 may be trained with the training data (e.g., images, ROI annotations, etc.) using various machine learning algorithms, such as stochastic gradient descent, for example.

The analysis tool 220 uses the structured identifier ROI(s) 330 information to extract, from each high quality image 230 (of the high resolution input frame 310), the corresponding ROI of the structured identifier from the high quality image (referred to as ROI crops 340 in FIG. 3) (step 366). The ROI crops 340 are provided to the decoding tool 224, which is configured to determine structured identifier data 350 corresponding to the high resolution input frame 310 (step 368). In one example, the structured identifier data 350 can include a list of structured identifiers for the high resolution input frame 310. In one embodiment, the decoding tool 224 can extract, from each ROI crop 340, an image of the structured identifier (e.g., structured identifier image 236) within the ROI crop 340. The decoding tool 224 can then decode the structured identifier to obtain the structured identifier data 350. In some cases, the decoding tool 224 can use one or more structured identifier reading algorithms to obtain the structured identifier data 350 from the ROI crops 340. In some cases, the decoding tool 224 can use a machine learning model 308 to obtain the structured identifier data 350 from the ROI crops 340. Note that FIG. 3 depicts the machine learning model 308 as being executed by the CPUs 304 1-N, in other embodiments, the machine learning model 308 can be executed by the GPUs 302 1-N.

In some embodiments, the computing system 210 includes one or more GPUs 302 1-N (e.g., as part of the processors 212) and one or more CPUs 304 1-N (e.g., as part of processors 212). The GPUs 302 1-N may be configured to execute one or more operations of the detector tool 222, the analysis tool 220, and/or the decoding tool 224. In this embodiment, for example, the GPUs 302 1-N execute one or more operations of the detector tool 222. Additionally or alternatively, the CPUs 304 1-N may be configured to execute one or more operations of the detector tool 222, the analysis tool 220, and/or the decoding tool 224. In this embodiment, for example, the CPUs 304 1-N execute one or more operations of the analysis tool 220 and the decoding tool 224.

In one particular embodiment, each CPU 304 1-N may decode a different structured identifier within the ROI crops 340. In some cases, the CPUs 304 1-N may decode a different structured identifier from the ROI crops 340 in parallel. In another particular embodiment, the operations of the detector tool 222, the operations of the analysis tool 220, and the operations of the decoding tool 224 may be performed (or executed) in parallel. The operations of the detector tool 222, analysis tool 220, and the decoding tool 224 may have similar latency which may allow for parallel execution. As an example, while CPUs 304 1-N are processing a first high resolution input frame 310 (e.g., high resolution input frame N), the GPUs 302 1-N may be processing a second high resolution input frame 310 (e.g., high resolution input frame N+1).

Figure 4:
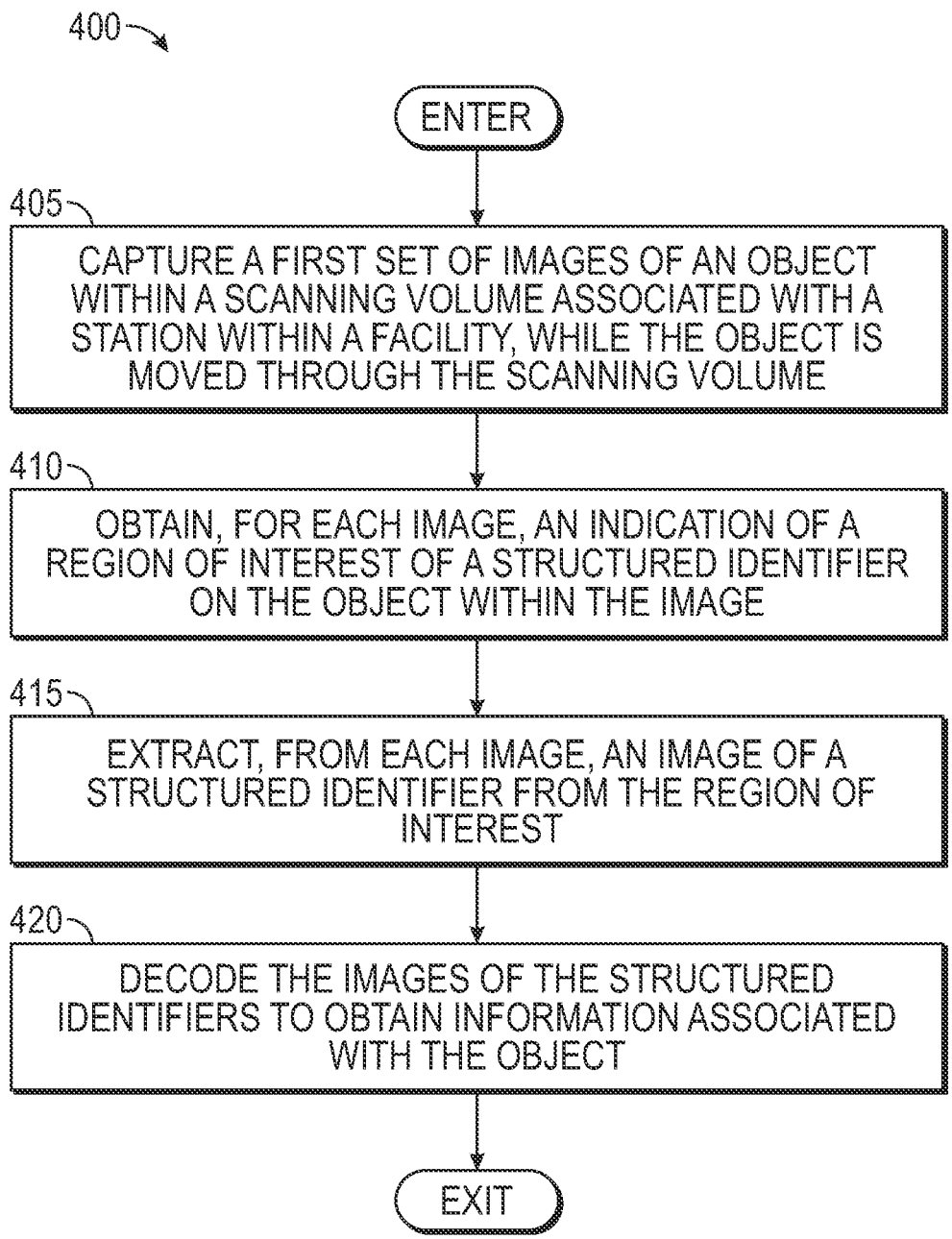
FIG. 4 is a flowchart of a method for performing a scan-free reading of a structured identifier, according to one embodiment.

FIG. 4 is a flowchart of a method 400 for performing a scan-free reading of a barcode, according to one embodiment. The method 400 may be performed by one or more components of a scan-free reader system (e.g., scan-free reader system 150).

Method 400 may enter at block 405, where the scan-free reader system captures a first set of images (e.g., high quality images 230) of an object within a scanning volume associated with a station within a facility, while the object is moved through the scanning volume. As noted, in some cases, the object may be moved through the scanning volume in an unstructured manner. For example, the object may be thrown through the scanning volume, rotated through the scanning volume, flipped through the scanning volume, etc. In some cases, the object may be moved through the scanning volume in a limited structured manner. For example, the object may be moved through the scanning volume by a robotic arm using a predefined or dynamically generated movement profile. With the unstructured manner and the limited structured manner, the object may be moved through the scanning volume without an explicit presentation of the object to an optical scanner.

In one embodiment, the first set of images that are captured in block 405 may be high quality images (e.g., high resolution images) captured by high quality camera devices (e.g., camera devices 202). Each camera device may be disposed in a different location within the facility in order to create the scanning volume. In one particular embodiment, the first set of images may have a resolution of approximately 20 megapixels or greater. Note, however, that the first set of images may have other image attributes of higher quality.

At block 410, the scan-free reader system obtains, for each image of the first set of images, an indication of a ROI of a structured identifier (e.g., ROI images 234) on the object within the image. As noted, in some embodiments, the ROI of the structured identifier may include a bounding box of a shipping label on the object. The operations in block 410 are described in more detail with respect to FIG. 5. At block 415, the scan-free reader system extracts, from each image of the first set of images, an image of a structured identifier from the ROI of the structured identifier within the image of the first set of images. At block 420, the scan-free reader system decodes the images of the structured identifiers (e.g., structured identifier images 236) to obtain structured identifier data associated with the object. The method 400 may then exit.

Figure 5:
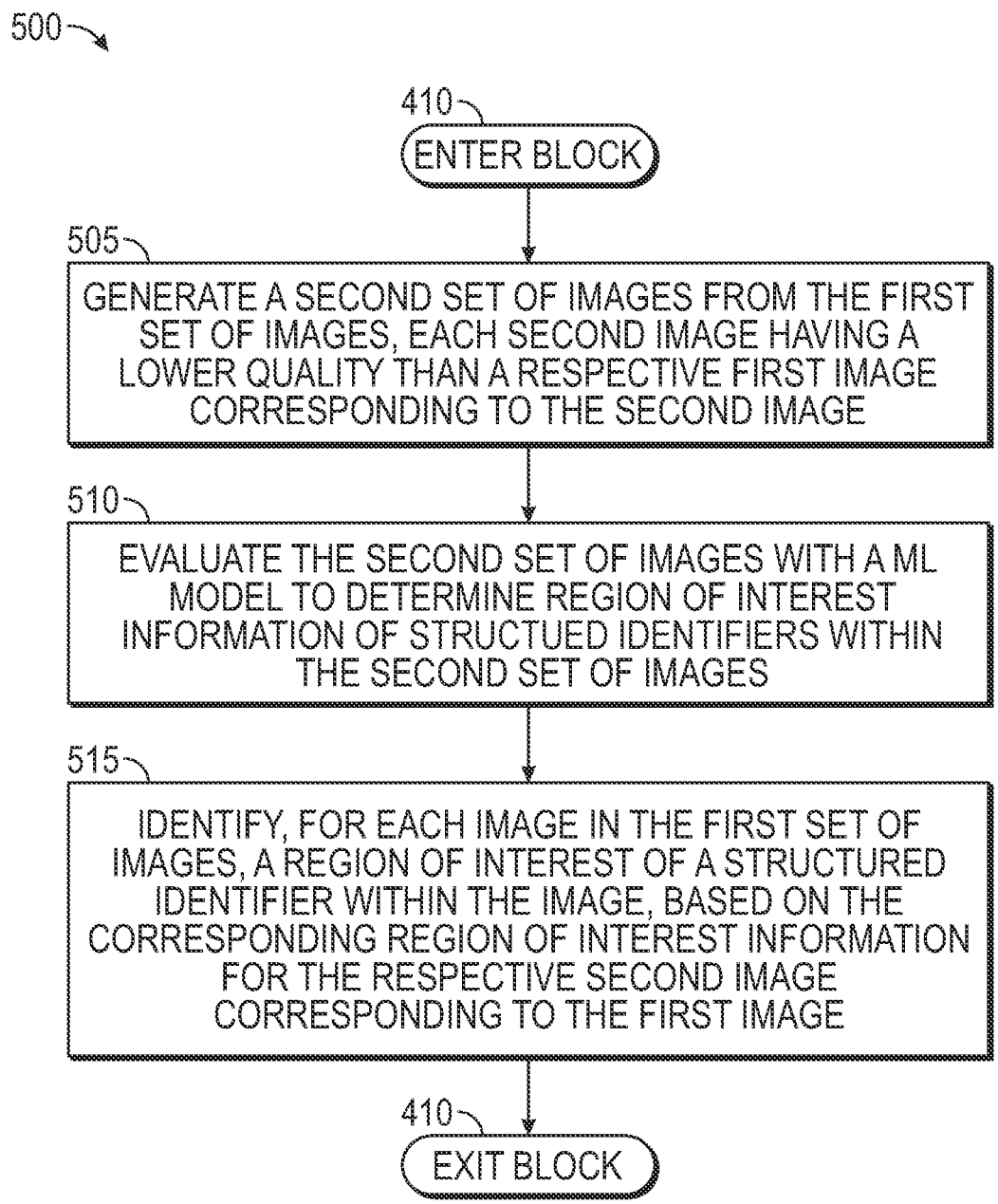
FIG. 5 is a flowchart of a method for obtaining region of interest information of a structured identifier from an image, according to one embodiment.

FIG. 5 is a flowchart of a method 500 for obtaining ROI information of a structured identifier from an image, according to one embodiment. The method 500 may be performed by one or more components of a scan-free reader system (e.g., scan-free reader system 150). In one embodiment, the method 500 may be used to perform the operations of block 410 of method 400 in FIG. 4.

Method 500 may enter at block 505, where the scan-free reader system generates a second set of images (e.g., low quality images 232) from the first set of images (e.g., high quality images 230). For example, the scan-free reader system can generate, for each captured image in the first set of images, a second image that has a lower quality (e.g., lower resolution) than the first image. At block 510, the scan-free reader system evaluates the second set of images with a machine learning model (e.g., machine learning model 306) to determine ROI information of structured identifiers of the second set of images. For example, the machine learning model may be configured to output, for a given image, an indication of the ROI of the structured identifier within the image. In some cases, the ROI can include a shipping label on the object and the indication of the ROI can include a bounding box of the shipping label.

At block 515, the scan-free reader system identifies, for each image in the first set of images, a ROI of a structured identifier within the image, based on the corresponding ROI information for the respective second image corresponding to the first image. The method 500 may then exit.

Figure 6A:
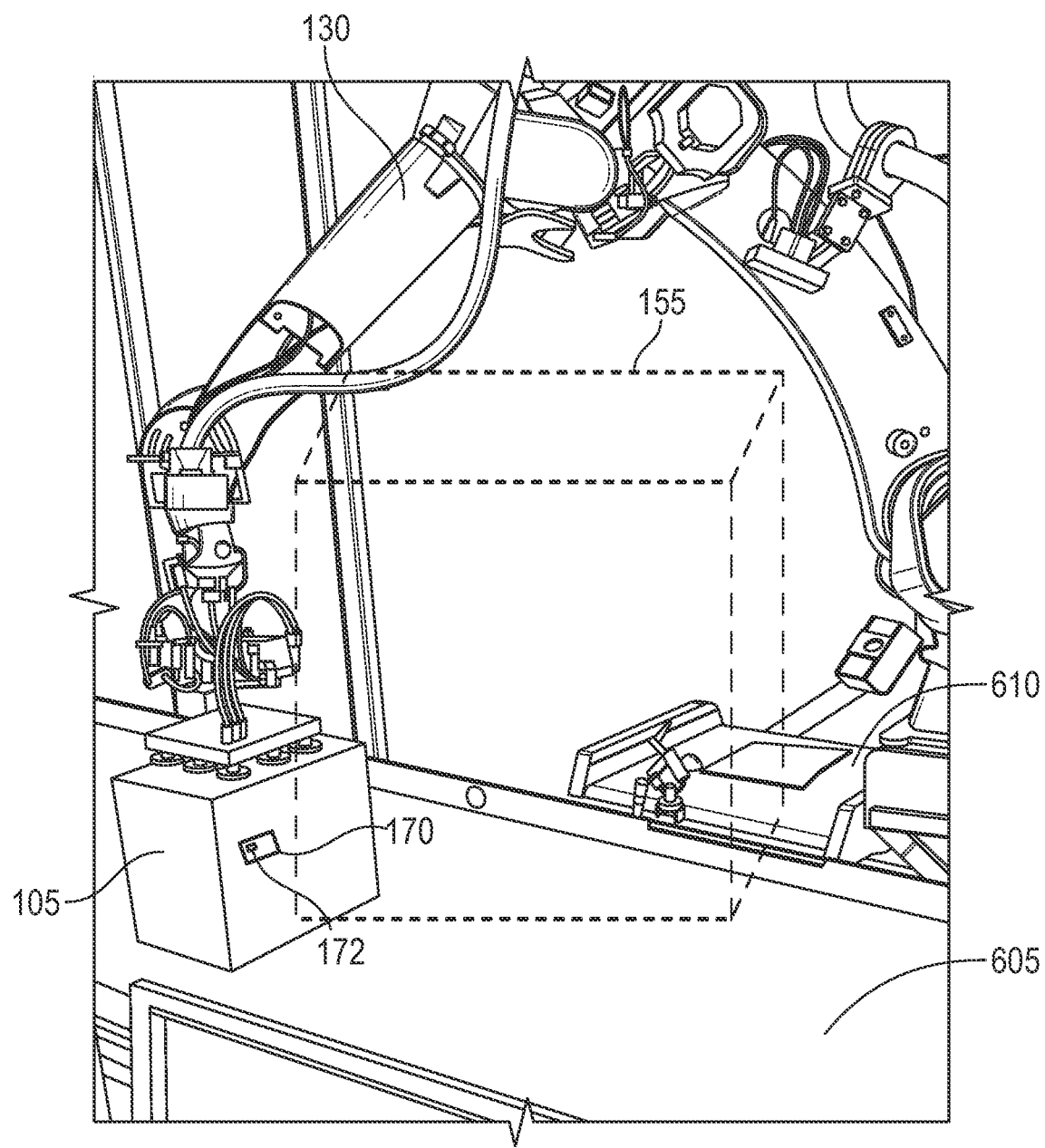
FIG. 6A-6D illustrate an example sequence for performing a scan-free reading of a structured identifier during a facility operation, according to one embodiment.
Figure 6B:
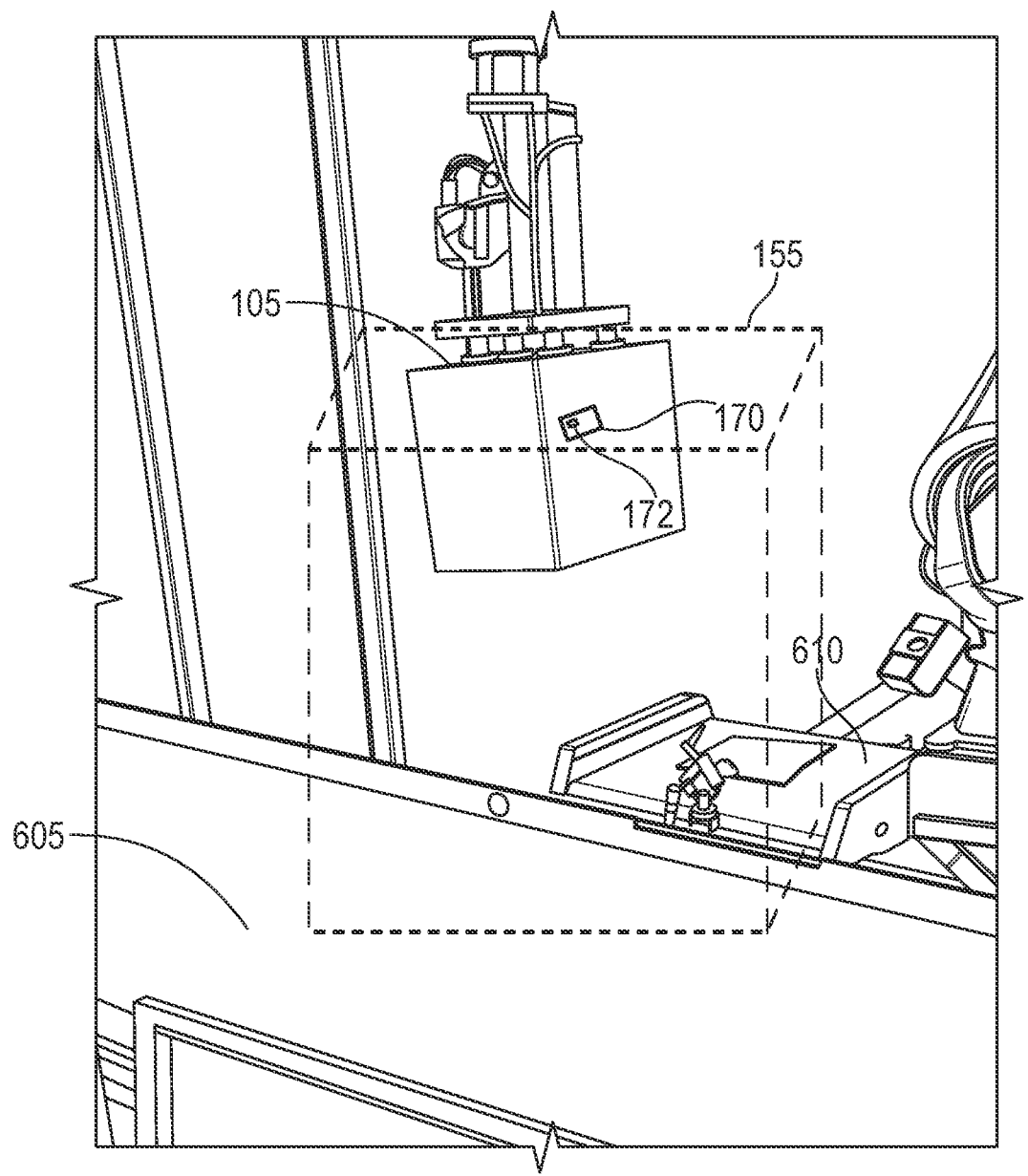
Figure 6C:
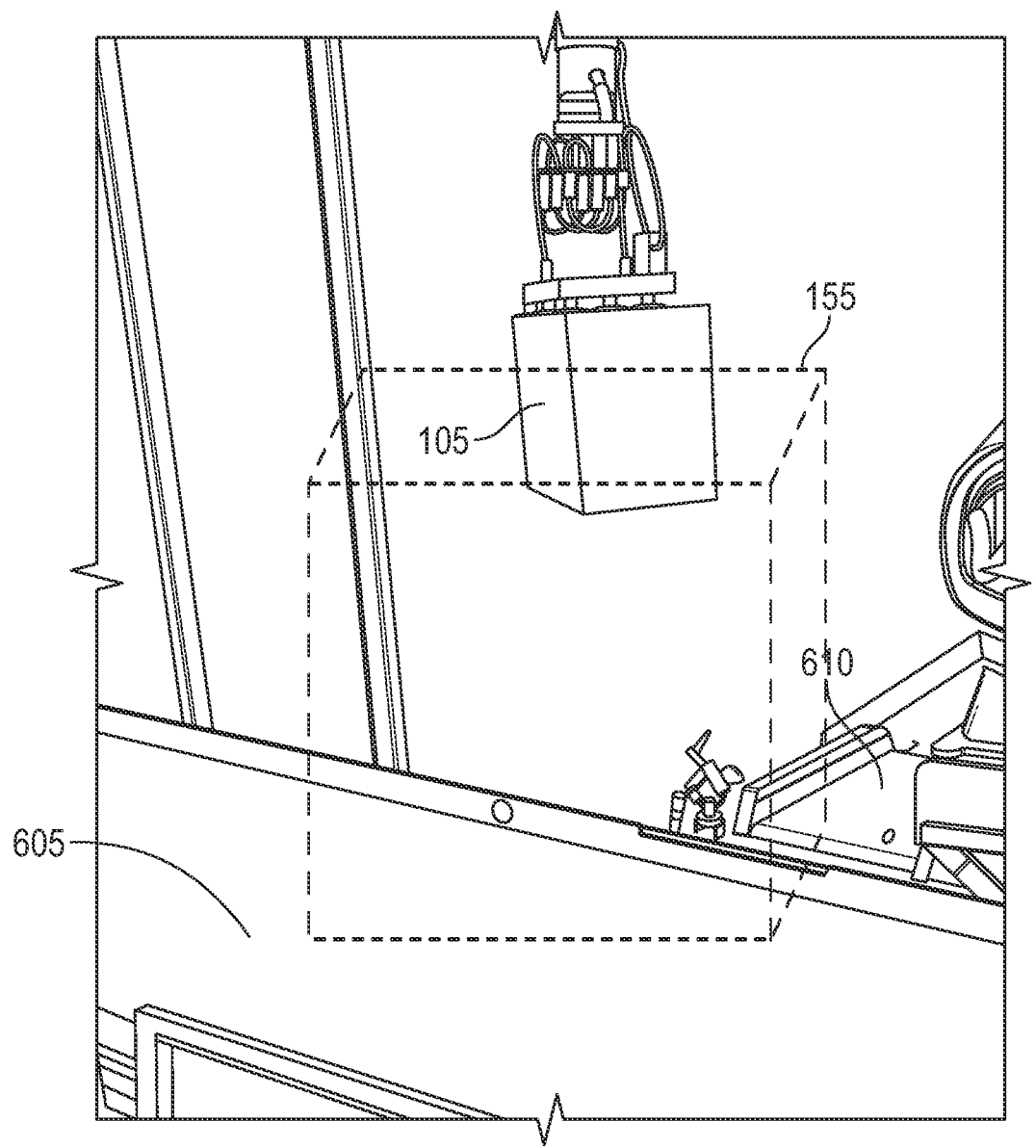
Figure 6D:
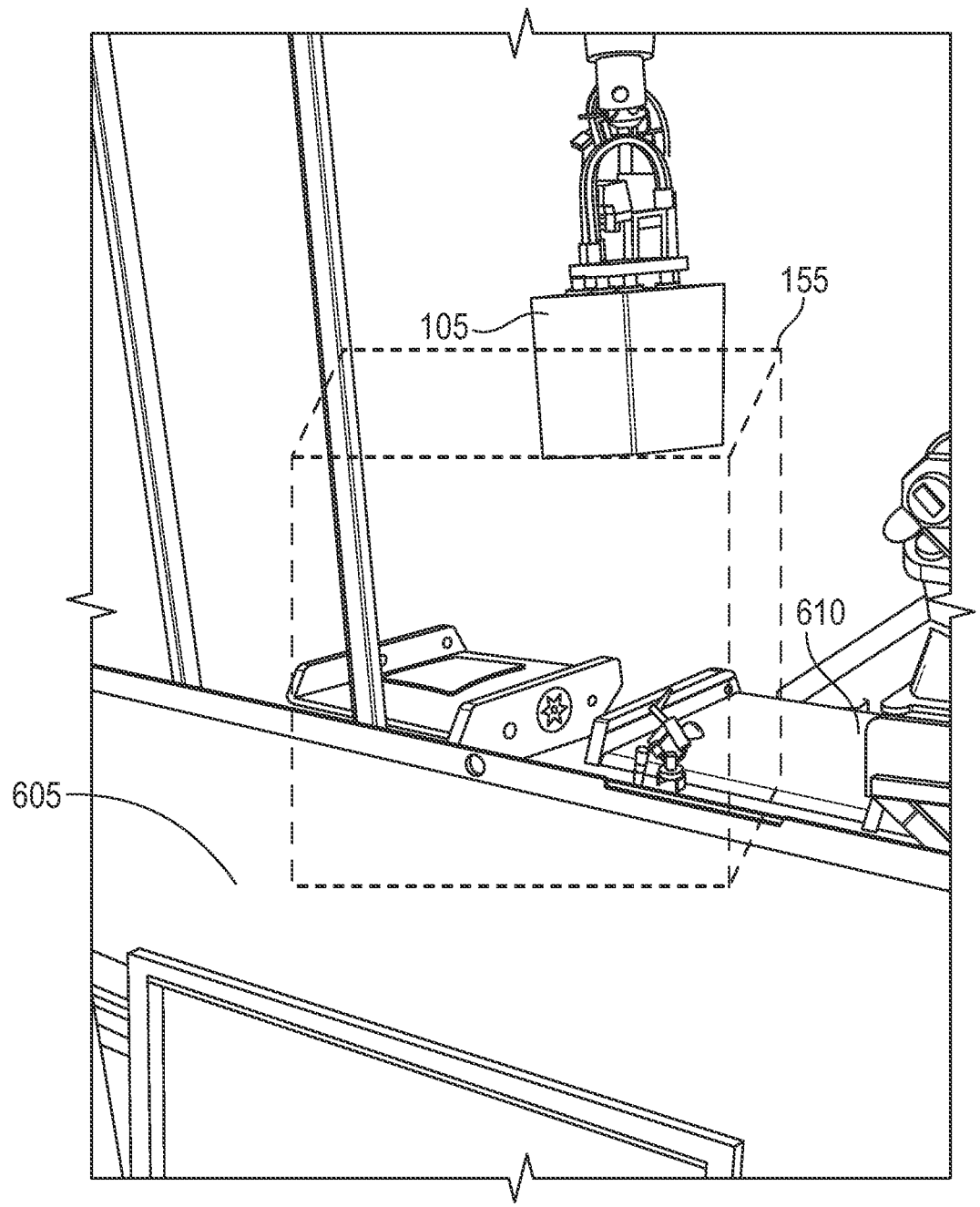

FIG. 6A-6D illustrate an example sequence for performing a scan-free reading of a structured identifier during a facility operation, according to one embodiment. In this sequence, an operator (e.g., robotic arm 130) is picking items (or objects or packages) from a conveyor 605 and transporting the items to another location 610 (e.g., another conveyor, table, staging location, etc.). The operator (e.g., robotic arm 130) is configured to use a predefined movement profile to transport the item 105. As shown in FIG. 6A, for example, the robotic arm 130 engages the item 105 (e.g., depicted as a box) on the conveyor with its EOAT (e.g., EOAT 140). After the robotic arm 130 engages the item 105, the robotic arm 130 performs a movement operation that transports the item 105 through a scanning volume 155. For example, the movement operation involves lifting the item 105 (FIG. 6B) and rotating (or twirling) the item 105 through the scanning volume 155 (FIGS. 6C and 6D). As noted above, as the item 105 is moved through the scanning volume 155, the scan-free reader system can detect and decode the structured identifier 172 on the label 170 without an explicit presentation of the structured identifier 172 to an optical scanner.

Note, although the scanning volume 155 is depicted in FIGS. 6A-6D, the scanning volume 155 may be transparent (e.g., not visible) to an operator in the facility. Thus, the scanning volume 155 is depicted with dashed lines in FIGS. 6A-6D. For the sake of clarity, the camera devices (e.g., camera devices 202) used to create the scanning volume 155 are not shown in FIGS. 6A-6D. As noted, in some embodiments, the camera devices can be disposed in different locations/orientations within an environment in order to create the 3D scanning volume. Additionally, note that the scanning volume 155 shown in FIGS. 6A-6D is merely a reference example of a scanning volume that can be created with the use of multiple camera devices disposed in different locations/orientations within the environment. In other embodiments, the scanning volume 155 can have different 3D geometric shapes (e.g., cylinder, cone, triangular, etc.), different sizes, and/or can be disposed in different locations within the environment.

Figure 7B:
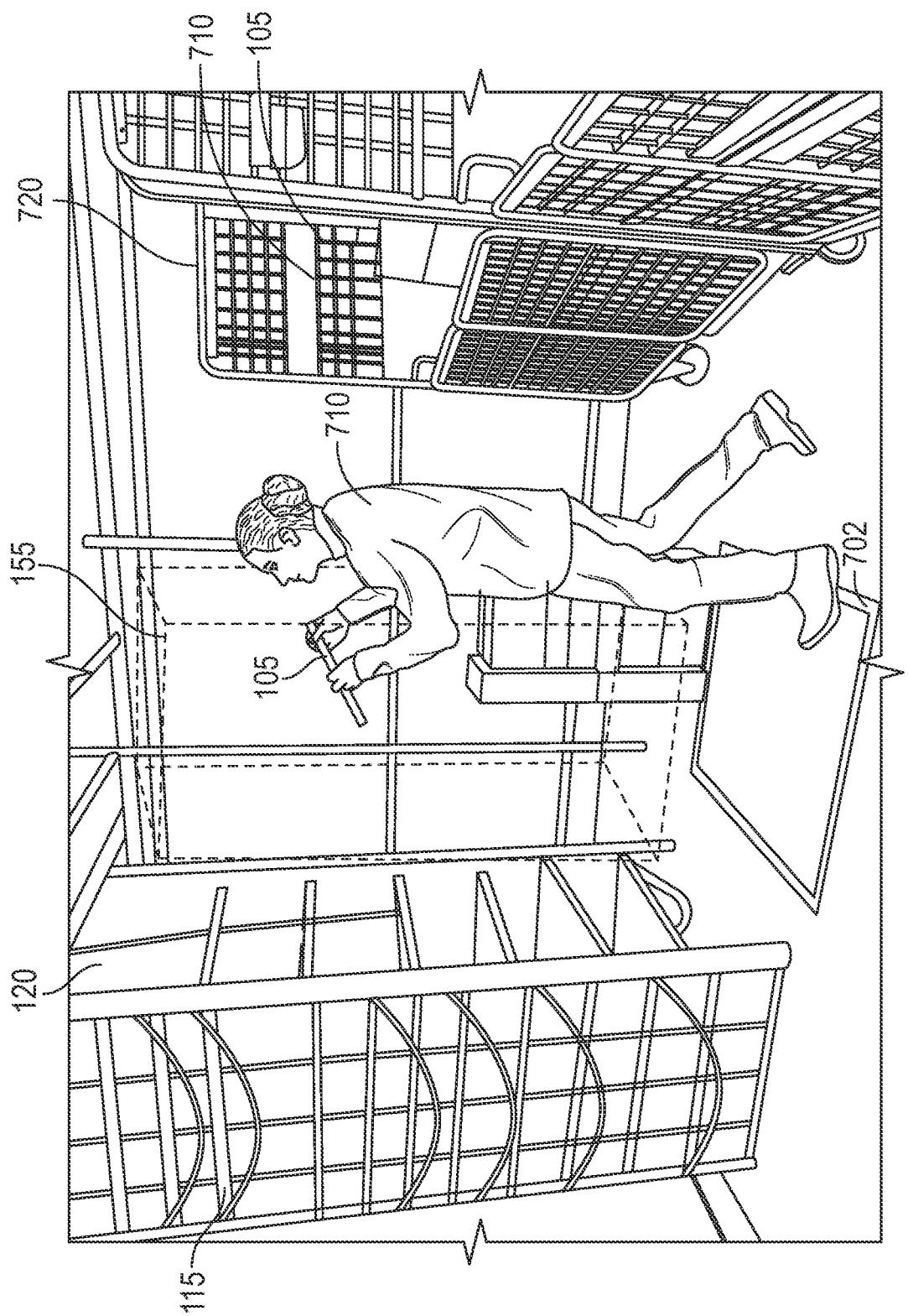

FIG. 7A-7G illustrate another example sequence for performing a scan-free reading during a facility operation, according to one embodiment. In this sequence, an operator 710 (e.g., associate) is stowing items (or objects or packages) from a bin 720 into different containers 120 of a rack 115. As part of the sequence, the operator 710 retrieves a first item 105 from the bin 720 (FIG. 7A) and moves through a scanning volume 155 to insert the first item 105 into a container 120 within the rack 115 (FIGS. 7B and 7C). When the first item 105 moves through the scanning volume 155, the scan-free reader system can detect and decode the structured identifier 172 on the first item 105 without the structured identifier 172 being explicitly presented to an optical scanner. For example, as shown in FIGS. 7B and 7C, the operator 710 places the first item 105 into the container without such explicit presentation of the structured identifier 172. Note that the structured identifier 172 on the first item 105 is shown in FIG. 7C, but is not shown in FIGS. 7A and 7B.

Figure 7D:
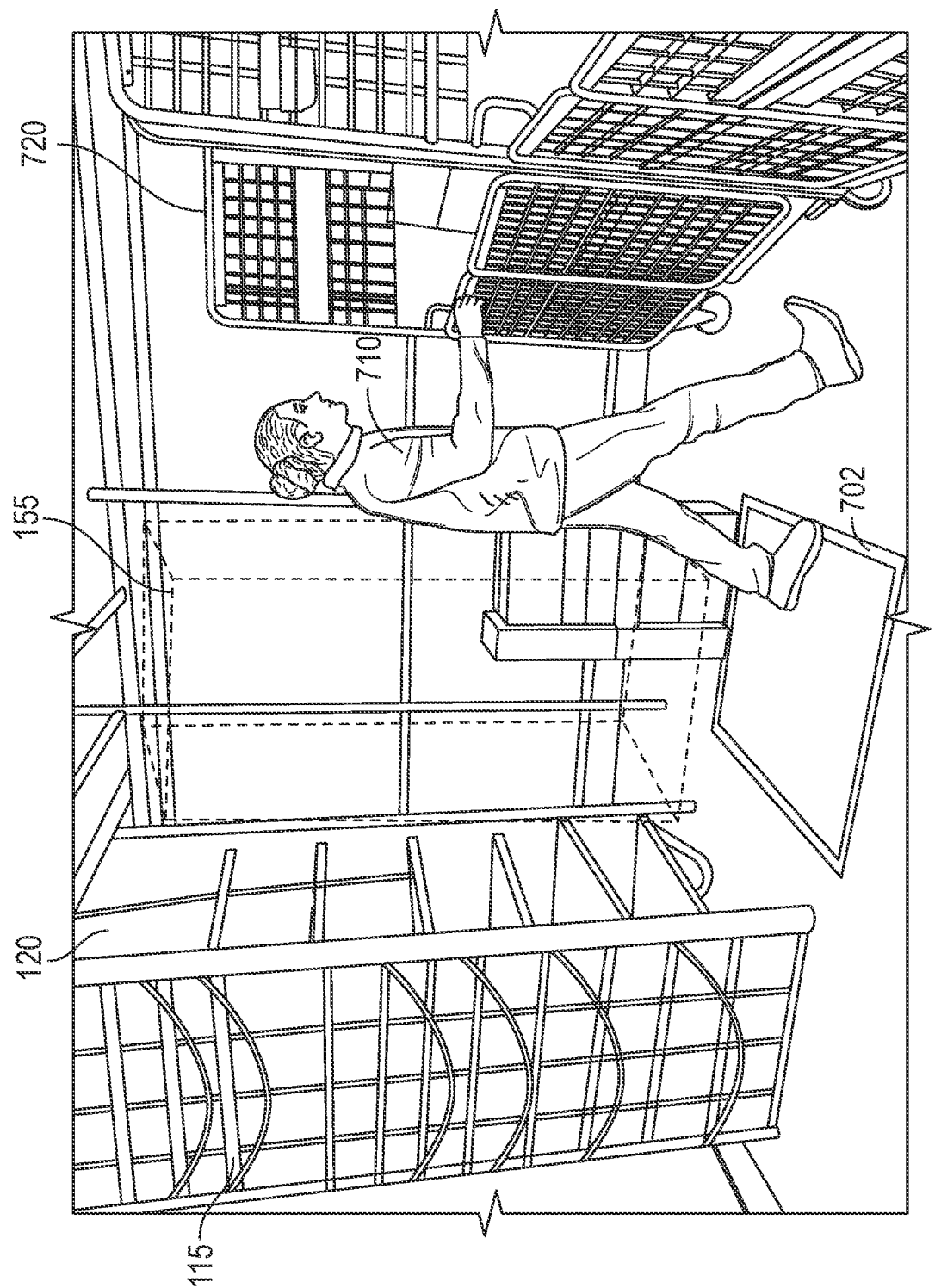
Figure 7E:
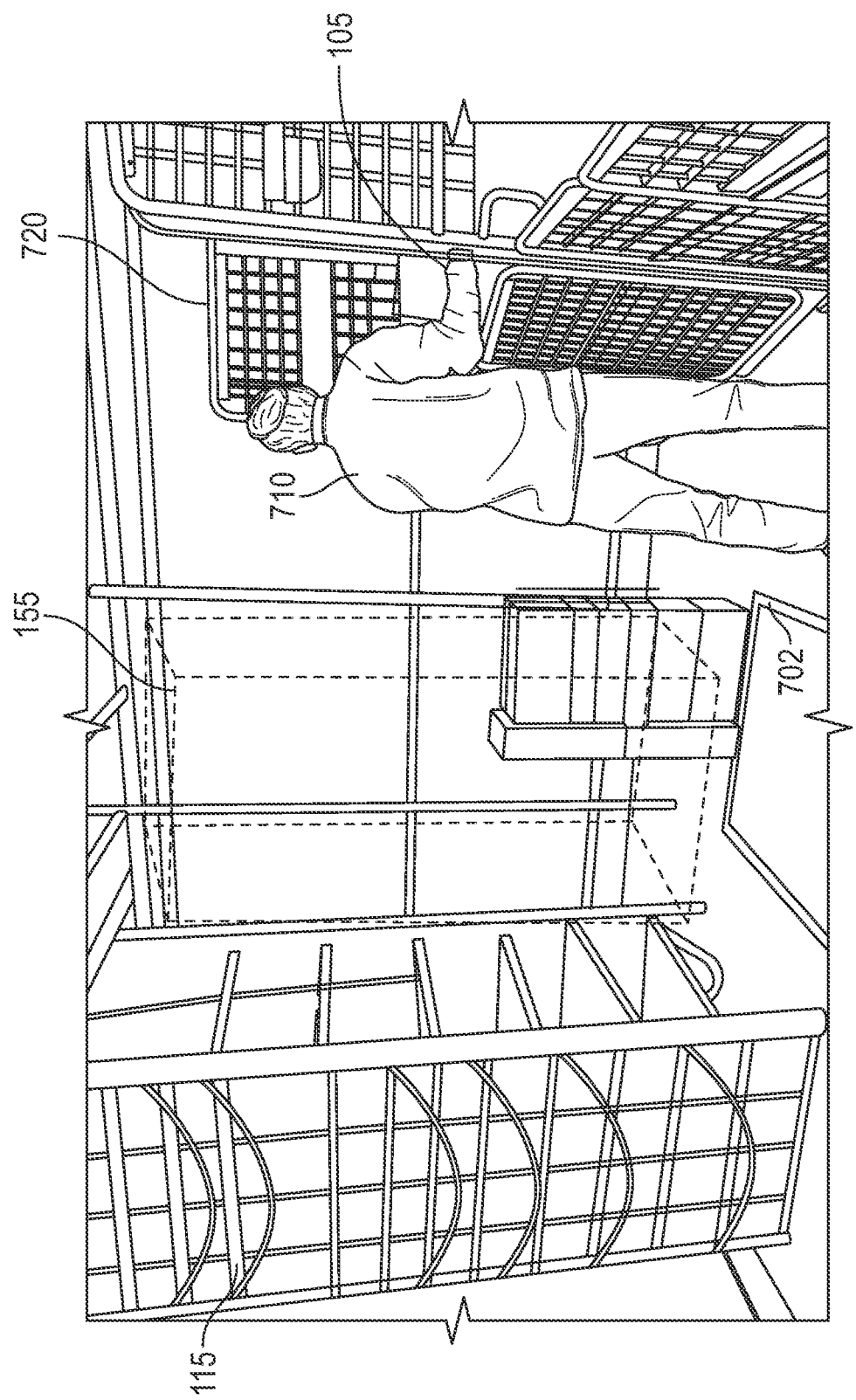
Figure 7F:
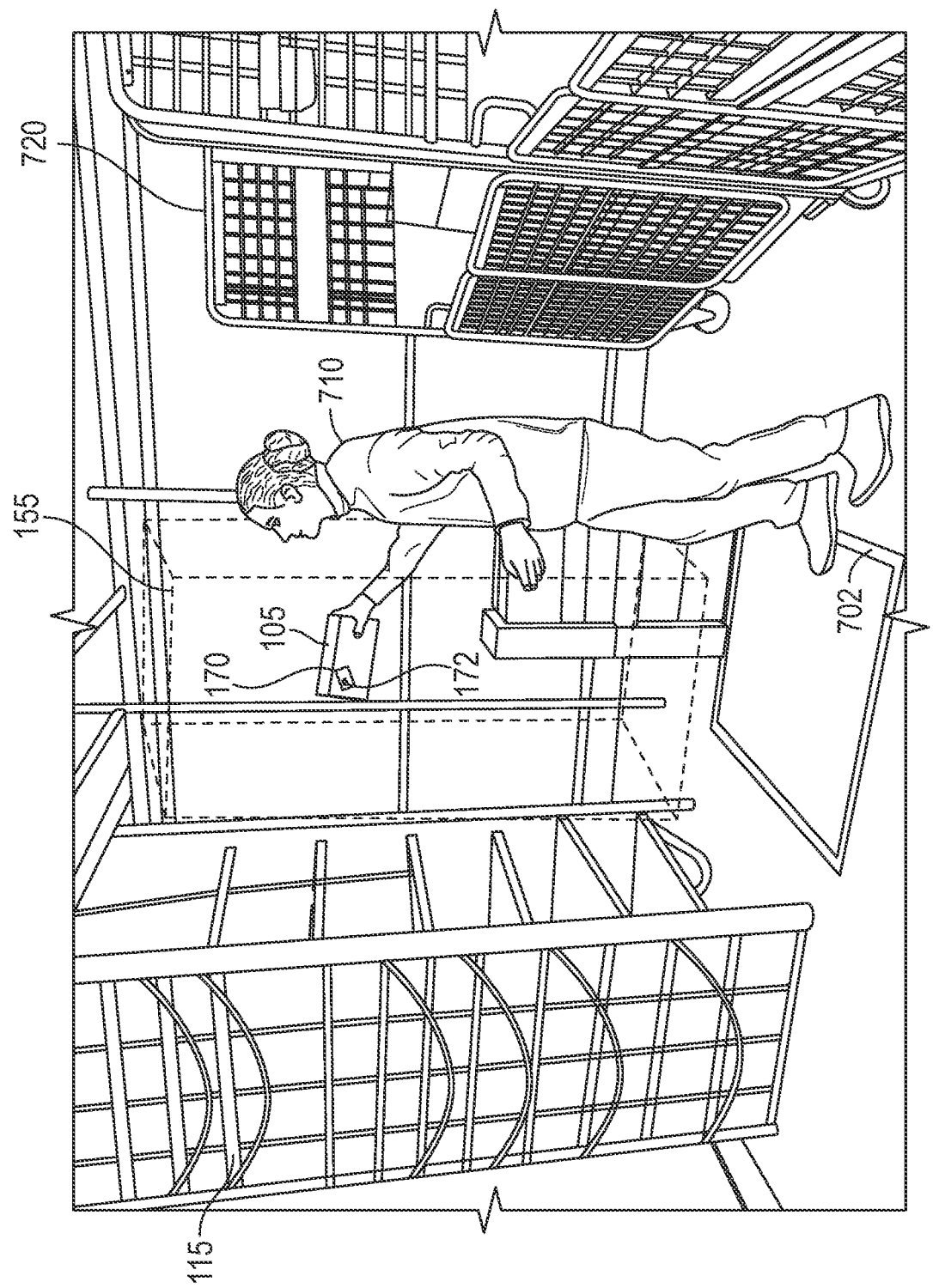
Figure 7G:
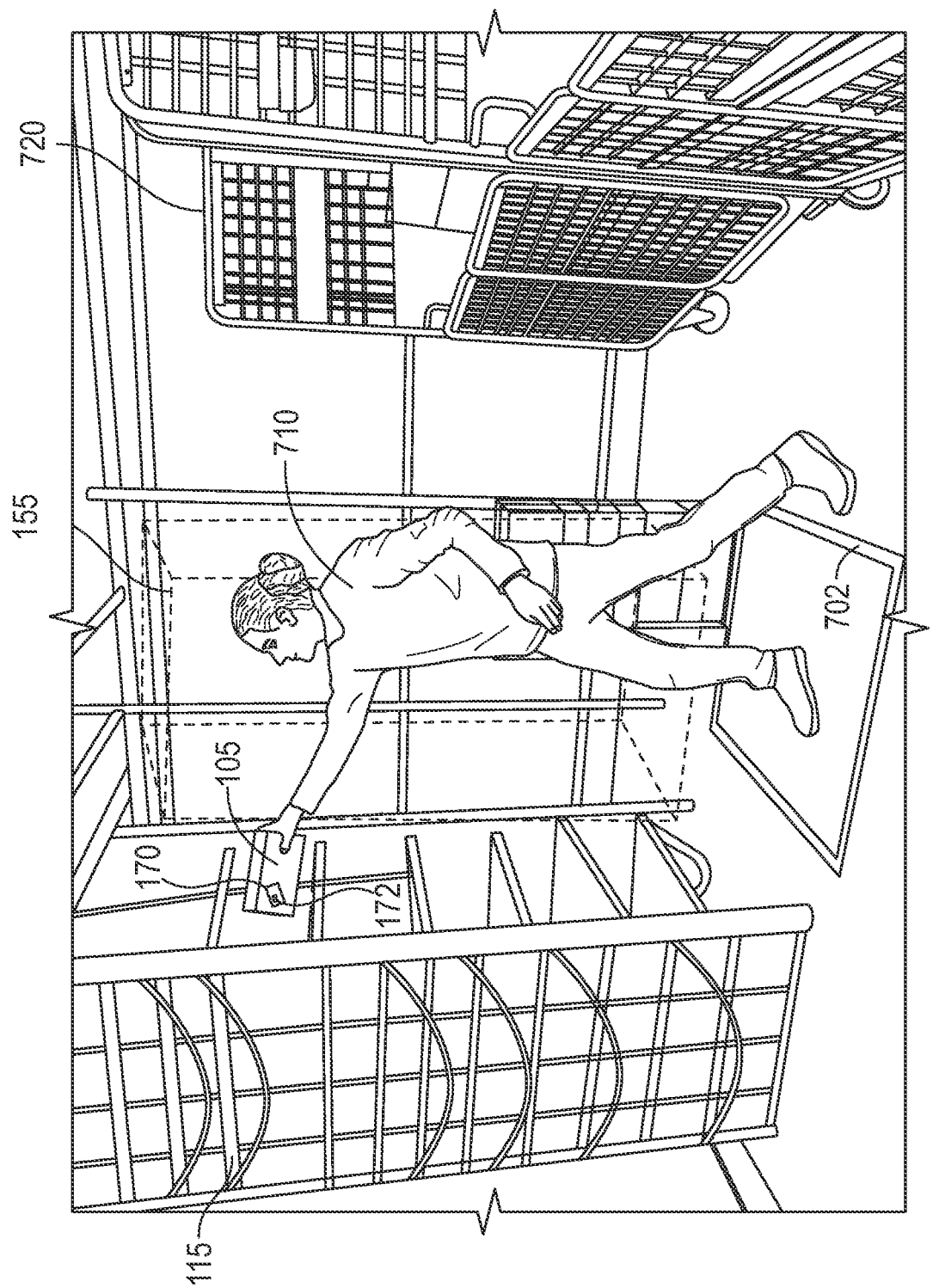

After placing the first item 105 into one of the containers 120, the operator 710 returns to the bin 720 to retrieve a second item 105 (FIG. 7D). After retrieving the second item 105 (FIG. 7E), the operator 710 moves the second item 105 through the scanning volume 155 to insert the second item 105 into one of the containers 120, without explicitly presenting the structured identifier 172 on the second item 105 to an optical scanner (FIGS. 7F and 7G). Note, although the scanning volume 155 is depicted in FIGS. 7A-7G, the scanning volume 155 may be transparent (e.g., not visible) to an operator in the facility. Thus, the scanning volume 155 is shown with "dashed" lines in FIGS. 7A-7G. In some embodiments, markings 702 can be placed on the floor to indicate to the operator 710 the approximate location of the scanning volume 155.

For the sake of clarity, the camera devices (e.g., camera devices 202) used to create the scanning volume 155 are not shown in FIGS. 7A-7G. As noted, in some embodiments, the camera devices can be disposed in different locations/orientations within an environment in order to create the 3D scanning volume. Additionally, note that the scanning volume 155 shown in FIGS. 7A-7D is merely a reference example of a scanning volume that can be created with the use of multiple camera devices disposed in different locations/orientations within the environment. In other embodiments, the scanning volume 155 can have different 3D geometric shapes (e.g., cylinder, cone, triangular, etc.), different sizes, and/or can be disposed in different locations within the environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A scan-free reader system, comprising
a plurality of image sensors, each disposed in a different location within an environment to create a scanning volume within the environment; and
a computing system coupled to the plurality of image sensors and configured to:
    capture, via the plurality of image sensors, a first plurality of images of an object within the scanning volume, wherein the object is moved through the scanning volume (i) as part of a picking operation or a stowing operation and (ii) without an explicit presentation of a structured identifier on the object to at least one of the plurality of image sensors;
    generate a second plurality of images corresponding to the first plurality of images, wherein each of the second plurality of images has a lower quality than a respective one of the first plurality of images;
    determine, via a machine learning model, a first region of interest of the structured identifier on the object within a first image of the second plurality of images;
    identify, based on the first region of interest, a second region of interest of the structured identifier on the object within a first image of the first plurality of images corresponding to the first image of the second plurality of images;
    extract an image of the second region of interest within the first image of the first plurality of images; and
    decode the structured identifier within the image of the second region of interest to obtain data corresponding to the structured identifier.

2. The scan-free reader system of claim 1, wherein the computing system is further configured to:
    determine, via the machine learning model, a third region of interest of the structured identifier on the object within a second image of the second plurality of images;
    identify, based on the third region of interest, a fourth region of interest of the structured identifier on the object within a second image of the first plurality of images corresponding to the second image of the second plurality of images; and
    extract an image of the fourth region of interest within the second image of the first plurality of images; and
    decode the structured identifier within the image of the fourth region of interest to obtain the data corresponding to the structured identifier.

3. The scan-free reader system of claim 2, wherein the structured identifier within the image of the second region of interest and the structured identifier within the fourth region of interest are decoded in parallel.

4. The scan-free reader system of claim 1, wherein the computing system is configured to determine the first region of interest and to decode the structured identifier within the image of the second region of interest in parallel.

5. The scan-free reader system of claim 1, wherein the object is moved through the scanning volume by at least one of: (i) being rotated through the scanning volume, (ii) being thrown through the scanning volume, or (iii) being flipped through the scanning volume.

6. A computer-implemented method for performing a scan-free barcode reading, the computer-implemented method comprising:
- obtaining a first set of images of an object within a scanning volume of an environment, wherein the object is passed through the scanning volume without an explicit presentation of a structured identifier on the object to an optical scanner within the environment;
- obtaining, for each image of a plurality of the first set of images, an indication of a first region of interest of the structured identifier on the object within the image, based at least in part on a second set of images of the object having a lower quality than the first set of images;
- extracting, from a first image of the plurality of the first set of images, the first region of interest of the structured identifier; and
- decoding the structured identifier within the first region of interest within the first image.

7. The computer-implemented method of claim 6, further comprising:
- extracting, from a second image of the plurality of the first set of images, the first region of interest of the structured identifier; and
- decoding the structured identifier within the first region of interest within the second image.

8. The computer-implemented method of claim 7, wherein the structured identifier within the first region of interest of the first image and the structured identifier within the first region of interest of the second image are decoded in parallel.

9. The computer-implemented method of claim 7, further comprising determining identifying information associated with the object based on the structured identifier decoded from the first region of interest of the first image and the structured identifier decoded from the first region of interest of the second image.

10. The computer-implemented method of claim 6, further comprising obtaining a third set of images of the object within the scanning volume, wherein:
- the first set of images are associated with a first time instance;
- the third set of images are associated with a second time instance; and
- the first time instance is prior to the second time instance.

11. The computer-implemented method of claim 10, further comprising obtaining, for at least one image of a plurality of the third set of images, an indication of a second region of interest of the structured identifier on the object within the at least one image of the plurality of the third set of images.

12. The computer-implemented method of claim 11, wherein obtaining the indication of the second region of interest of the structured identifier for the at least one image of the plurality of the third set of images occurs while the structured identifier of the first region of interest is being decoded.

13. The computer-implemented method of claim 6, further comprising evaluating the second set of images with a machine learning model to determine, for at least one image of the second set of images, a second region of interest of the structured identifier within the at least one image of the second set of images.

14. The computer-implemented method of claim 13, wherein obtaining, for each image of the plurality of the first set of images, the indication of the first region of interest of the structured identifier on the object within the image comprises:
- identifying which image in the second set of images corresponds to the image in the first set of images; and
- using a location of the second region of interest of the structured identifier within the identified image as a location of the first region of interest of the structured identifier.

15. The computer-implemented method of claim 6, wherein the object is passed through the scanning volume by at least one of: (i) being rotated through the scanning volume, (ii) being thrown through the scanning volume, or (iii) being flipped through the scanning volume.

16. The computer-implemented method of claim 6, further comprising receiving the second set of images from a plurality of camera devices disposed within the environment.

17. A computer-readable storage medium storing instructions, which, when executed on one or more computer processors, perform an operation comprising:
- obtaining a first set of images of an object within a scanning volume of an environment, wherein the object is passed through the scanning volume without an explicit presentation of a structured identifier on the object to an optical scanner within the environment;
- obtaining, for each image of a plurality of the first set of images, an indication of a first region of interest of the structured identifier on the object within the image, based at least in part on a second set of images of the object having a lower quality than the first set of images;
- extracting, from a first image of the plurality of the first set of images, the first region of interest of the structured identifier; and
- decoding the structured identifier within the first region of interest within the first image.

18. The computer-readable storage medium of claim 17, the operation further comprising:
- extracting, from a second image of the plurality of the first set of images, the first region of interest of the structured identifier; and
- decoding the structured identifier within the first region of interest within the second image.

19. The computer-readable storage medium of claim 18, wherein the structured identifier within the first region of interest of the first image and the structured identifier within the first region of interest of the second image are decoded in parallel.

20. The computer-readable storage medium of claim 17, wherein the object is passed through the scanning volume by at least one of: (i) being rotated through the scanning volume, (ii) being thrown through the scanning volume, or (iii) being flipped through the scanning volume.

* * * * *